(12) United States Patent
Johnston et al.

(10) Patent No.: US 11,146,049 B2
(45) Date of Patent: Oct. 12, 2021

(54) SYSTEM AND METHOD FOR HANGING A CABLE

(71) Applicant: Hubbell Incorporated, Shelton, CT (US)

(72) Inventors: Devan Emily Johnston, Hampstead, NH (US); Sarah Jane Parsons, Medford, MA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/629,841

(22) PCT Filed: Jul. 10, 2018

(86) PCT No.: PCT/US2018/041450
§ 371 (c)(1),
(2) Date: Jan. 9, 2020

(87) PCT Pub. No.: WO2019/014227
PCT Pub. Date: Jan. 17, 2019

(65) Prior Publication Data
US 2021/0057891 A1 Feb. 25, 2021

Related U.S. Application Data

(60) Provisional application No. 62/530,578, filed on Jul. 10, 2017.

(51) Int. Cl.
*H02G 3/00* (2006.01)
*H02G 3/04* (2006.01)

(52) U.S. Cl.
CPC ......... *H02G 3/0437* (2013.01); *H02G 3/0456* (2013.01)

(58) Field of Classification Search
CPC .......................... H02G 3/0437; H02G 3/0456
See application file for complete search history.

(56) References Cited

U.S. PATENT DOCUMENTS

| | | | | |
|---|---|---|---|---|
| 3,721,412 A | * | 3/1973 | Kindorf | F16L 3/227 248/73 |
| 6,959,898 B1 | * | 11/2005 | Laughlin | F16L 3/26 248/58 |
| 7,090,174 B2 | * | 8/2006 | Korczak | F16B 37/045 248/61 |

(Continued)

OTHER PUBLICATIONS

PCT/US2018/041450 International Search Report and Written Opinion dated Sep. 26, 2018.

*Primary Examiner* — Pete T Lee
(74) *Attorney, Agent, or Firm* — Michael Best & Friedrich LLP (57) ABSTRACT

A cable hanger configured to secure cables to a purlin. The cable hanger includes a first support leg, a second support leg, and a landing compartment positioned between the first support leg and the second support leg. The landing compartment is configured to hold one or more cables. The cable hanger further includes a first securing hook connected to the first support leg, and a second securing hook connected to the second support leg. Wherein, the first securing hook and the second securing hook are configured to secure the cable hanger to the purlin.

17 Claims, 6 Drawing Sheets

(56) References Cited

U.S. PATENT DOCUMENTS

| | | | |
|---|---|---|---|
| 7,661,634 B2* | 2/2010 | Thompson | B65D 63/1072 |
| | | | 248/74.3 |
| 2010/0251652 A1 | 10/2010 | Golden et al. | |
| 2011/0073718 A1* | 3/2011 | Whipple | F16L 3/2431 |
| | | | 248/58 |
| 2016/0123501 A1 | 5/2016 | Francies, III | |
| 2016/0153587 A1* | 6/2016 | Smith | H02G 3/30 |
| | | | 29/515 |

* cited by examiner

SYSTEM AND METHOD FOR HANGING A CABLE

RELATED APPLICATIONS

This application claims the benefit to U.S. Provisional Patent Application No. 62/530,578, filed on Jul. 10, 2017, the entire contents of both of which are incorporated herein by reference.

FIELD

Embodiments relate to a system and method for hanging cable.

SUMMARY

There is currently no easy solution for securing bundles of cable ranging in size to a purlin. Bundles of cables may be secured to a purlin by running Polyvinyl Chloride (PVC) tubing under the purlin and routing the cables through the conduit. Using such a method, material costs and/or labor costs may arise when securing cables to purlin. Additionally, once the bundle of cables is secured to the purlin using PVC tubing, it becomes quite difficult to inspect, replace, or add cables to the bundle.

Thus, one embodiment provides a cable hanger configured to secure cables to a purlin. The cable hanger includes a first support leg, a second support leg, and a landing compartment positioned between the first support leg and the second support leg. The landing compartment is configured to hold one or more cables. The cable hanger further includes a first securing hook connected to the first support leg, and a second securing hook connected to the second support leg. Wherein, the first securing hook and the second securing hook are configured to secure the cable hanger to the purlin.

Another embodiment provides a method of securing one or more cables to a purlin. The method includes providing a single piece of material, and forming, from the single piece of material, a landing compartment configured to support at least a first cable. The method further includes forming, from the single piece of material, a first securing hook configured to secure the single piece of material to a first flange of the purlin, and forming, from the single piece of material, a second securing hook configured to secure the single piece of material to a second flange of the purlin.

Yet another embodiment provides a cable hanger configured to secure cables to a purlin. The cable hanger including a first support leg, a second support leg, and a landing compartment positioned between the first support leg and the second support leg. The landing compartment is configured to hold one or more cables. The cable hanger further includes a first securing hook extending from the first support leg, and a second securing hook extending from the second support leg. Wherein, the first securing hook and the second securing hook are configured to secure the cable hanger to the purlin.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

FIGS. 1-6 illustrate a cable hanger 100 according to some embodiments. The cable hanger 100 is configured to secure, retain, and/or hold, one or more wires, or cables. In some embodiments, the cable hanger 100 has a height of approximately 3 inches to approximately 5 inches and a length of approximately 3 inches to approximately 7 inches.

Figure 5:
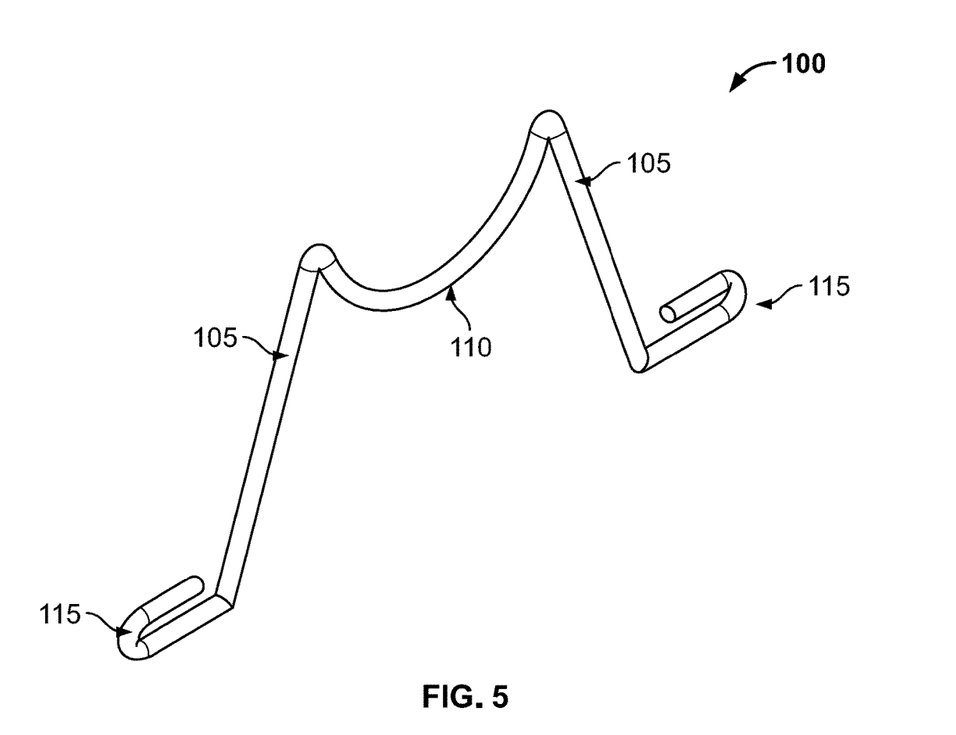
FIG. 5 is a perspective view of the cable hanger of FIG. 1 according to some embodiments.
Figure 6:
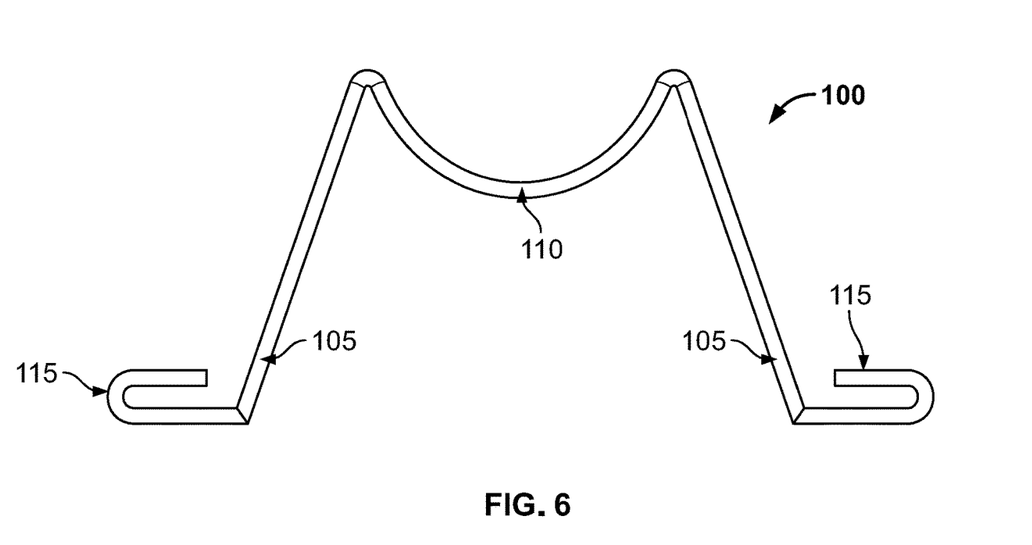
FIG. 6 is a front view of the cable hanger of FIG. 1 according to some embodiments.

The cable hanger 100 in FIG. 5 and FIG. 6 includes a first and a second support leg 105, a landing compartment 110, and a first and a second securing hook 115. The first and second support leg 105, the landing compartment 110, and the first and second securing hook 115 may be integrally formed as a single piece. In some embodiments, the cable hanger 100 is formed of a material (for example, a single cable of steel, a single rod of steel, a single cable of galvanized steel, a single rod of galvanized steel, a single cable of zinc plated steel, a single rod of zinc plated steel, a single cable of polyvinyl chloride (PVC) coated steel, a single rod of PVC coated steel, a single cable of PVC coated galvanized steel, a single rod of PVC coated galvanized steel, a single cable of powder coated steel, a single rod of powder coated steel, a single cable of powder coated galvanized steel, a single rod of powder coated galvanized steel, a single cable of PVC coated zinc steel, a single rod of PVC coated zinc steel, a single cable of powder coated zinc steel, a single rod of powder coated zinc steel, etc.). In some embodiments, the cable hanger 100 may be formed of a combination of two or more materials. In some embodiments, the material is a rod having a thickness of approximately 3 mm to approximately 8 mm.

Figure 1:
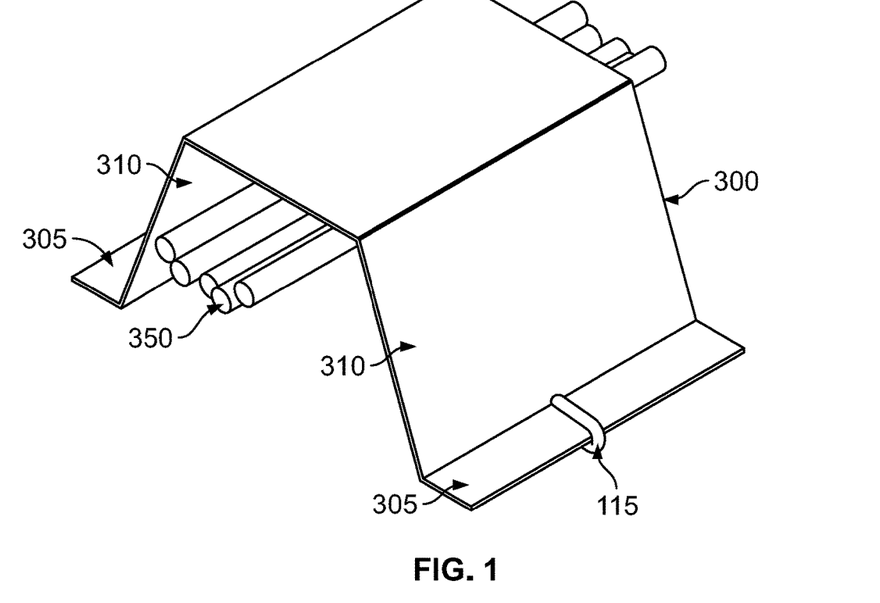
FIG. 1 is a perspective view of a purlin cable hanger securing, retaining, or holding, a plurality of cables according to some embodiments.
Figure 2:
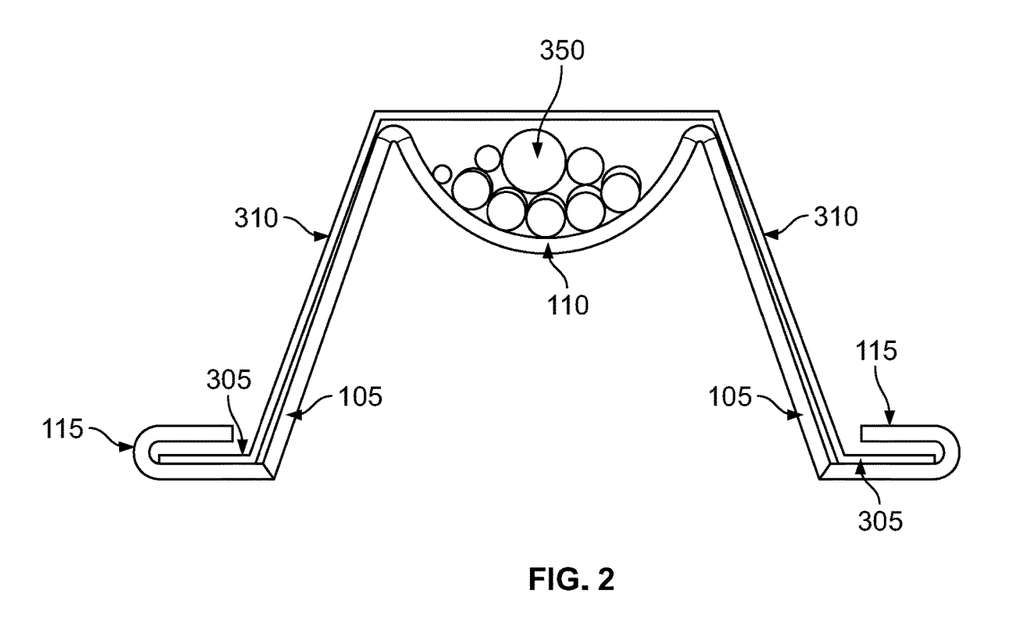
FIG. 2 is a front view of the purlin cable hanger of FIG. 1 securing, retaining, or holding, a plurality of cables according to some embodiments.

The landing compartment 110 is configured to support, or hold, one or more first cables 350. As shown in FIG. 2, the landing compartment 110 is capable of supporting cables 350 of various sizes and types. In the embodiment illustrated in FIGS. 1-4, the landing compartment 110 forms a U-shape. However, in other embodiments, the landing compartment 110 may be a different shape, such as a V-shape. In some embodiments, the cable landing compartment 110 has a radius of approximately 1 inch to approximately 5 inches (for example, approximately 1.5 inch).

In some embodiments, the cable hanger 100 is configured to secure one or more cables 350 to a purlin 300. In the embodiment illustrated in FIGS. 1-4 and FIGS. 7-10, the purlin 300 is a hat-channel purlin. As illustrated in FIG. 2, a first securing hook 115 wraps around a first purlin flange 305 and a second securing hook 115 wraps around a second purlin flange 305 such that the first securing hook 115 and the second securing hook 115 transfer the weight of the cables 350 to the top of a first purlin flange 305 and a second purlin flange 305 respectively. The support leg 105 is configured to connect the securing hook 115 to the landing compartment 110. In the illustrated embodiment, the support leg 105 runs parallel to a purlin wall 310. However, in other embodiments, the support leg 105 is not necessarily parallel to the purlin wall 310.

In the embodiment illustrated in FIGS. 1-4 and FIGS. 7-10, the landing compartment 110 is positioned above the first and second securing hook 115. Additionally, the landing compartment 110 is positioned between the first and second purlin wall 310. The position of the landing compartment 110 is advantageous because it safely secures the cables 350 under the purlin so that the purlin 300 may protect the cables 350 from rain, wind, sunlight, etc.

Figure 3:
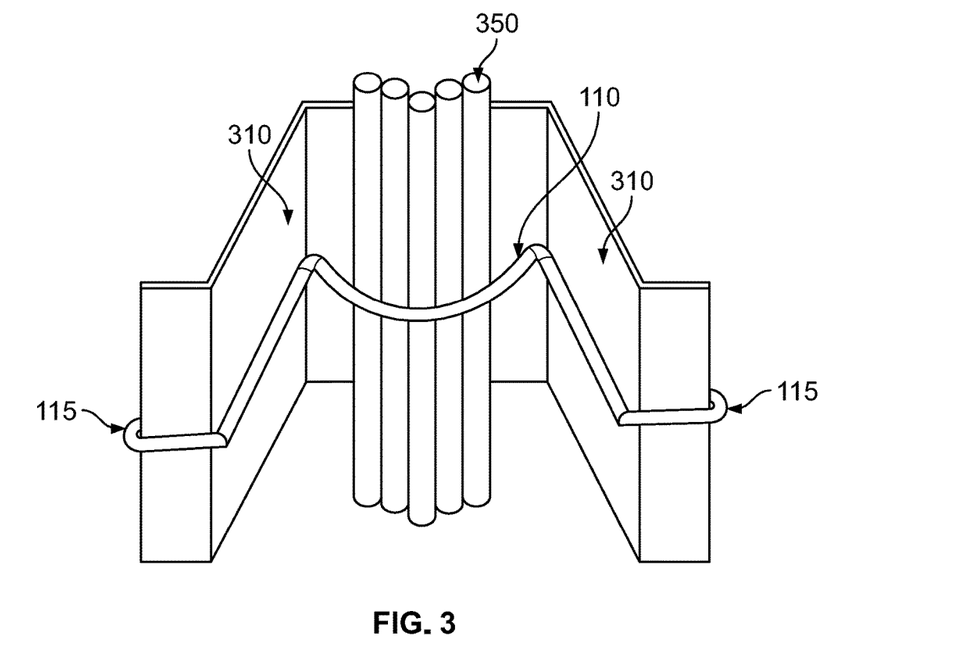
FIG. 3 is a bottom view of the cable hanger of FIG. 1 securing, retaining, or holding, a plurality of cables according to some embodiments.
Figure 4:
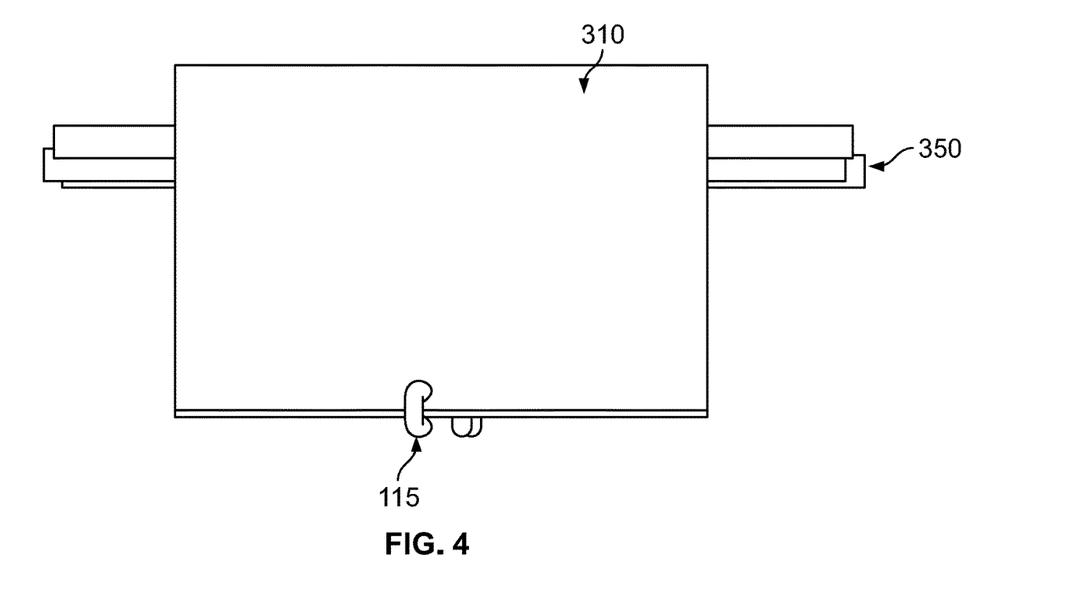
FIG. 4 is a side view of the cable hanger of FIG. 1 securing, retaining, or holding, a plurality of cables according to some embodiments.

In operation, the cables 350 are supported by the landing compartment 110. As shown in FIG. 2 and FIG. 3, the shape and stance of the cable hanger 100 remains substantially unchanged while the cables 350 are supported by the landing compartment 110. This may be a result of the rigidity of the material used to form the cable hanger.

Figure 7:
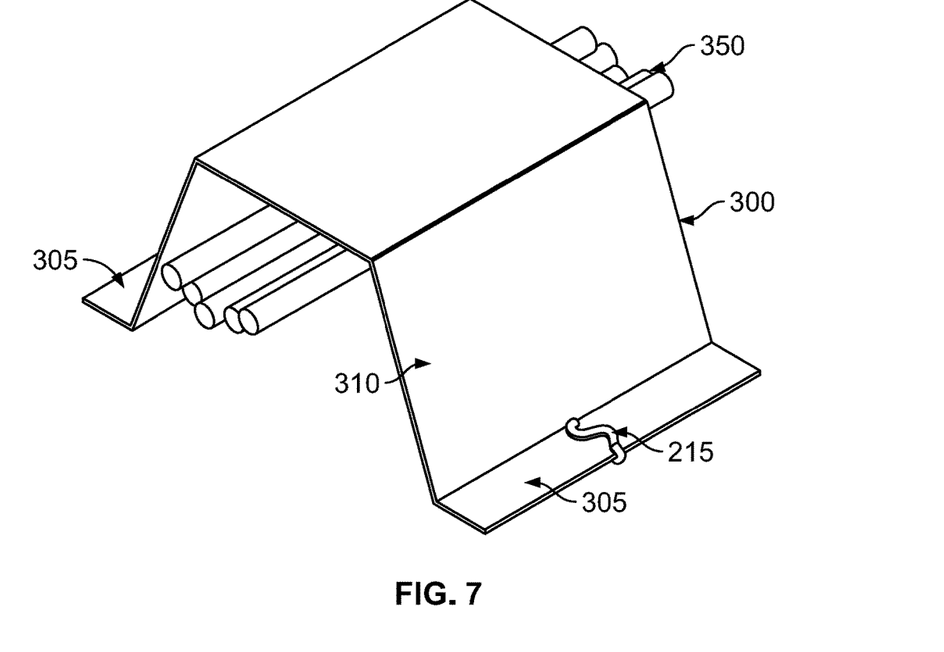
FIG. 7 is a perspective view of a purlin cable hanger securing, retaining, or holding, a plurality of cables according to some embodiments.
Figure 8:
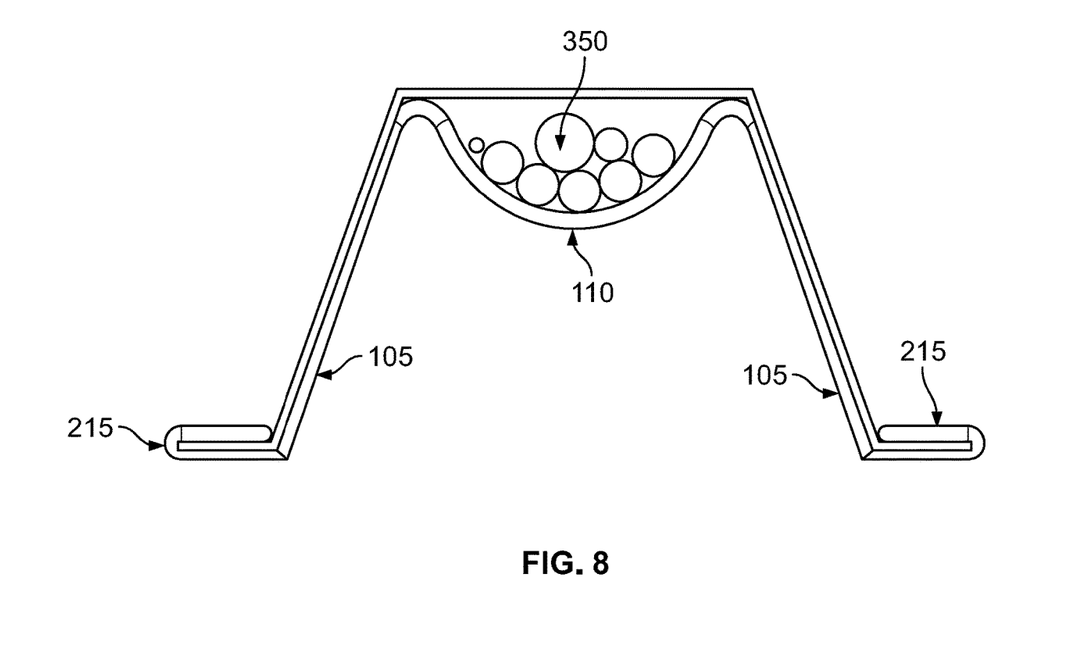
FIG. 8 is a front view of the purlin cable hanger of FIG. 7 securing, retaining, or holding, a plurality of cables according to some embodiments.
Figure 9:
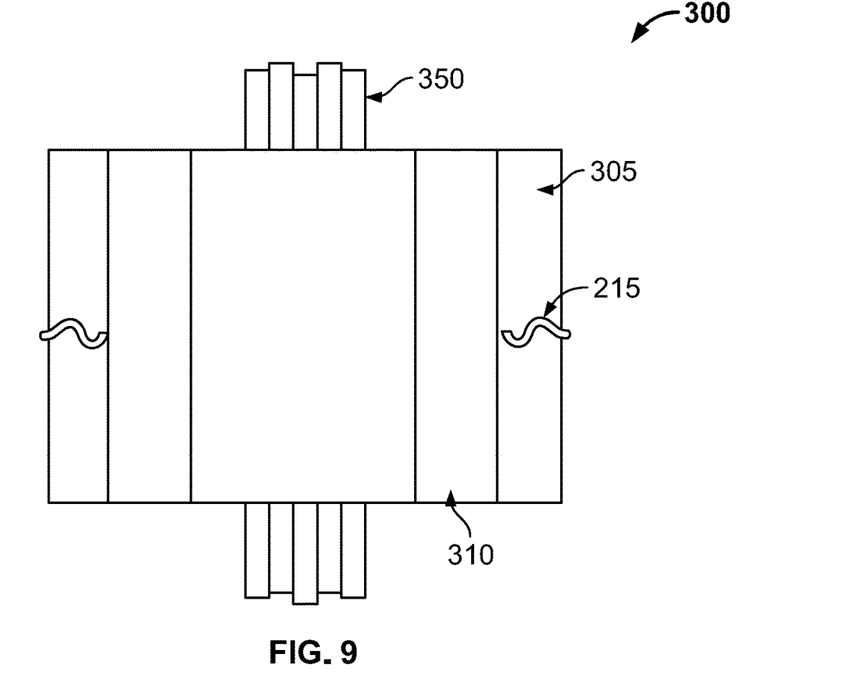
FIG. 9 is a top view of the purlin cable hanger of FIG. 7 securing, retaining, or holding, a plurality of cables according to some embodiments.
Figure 10:
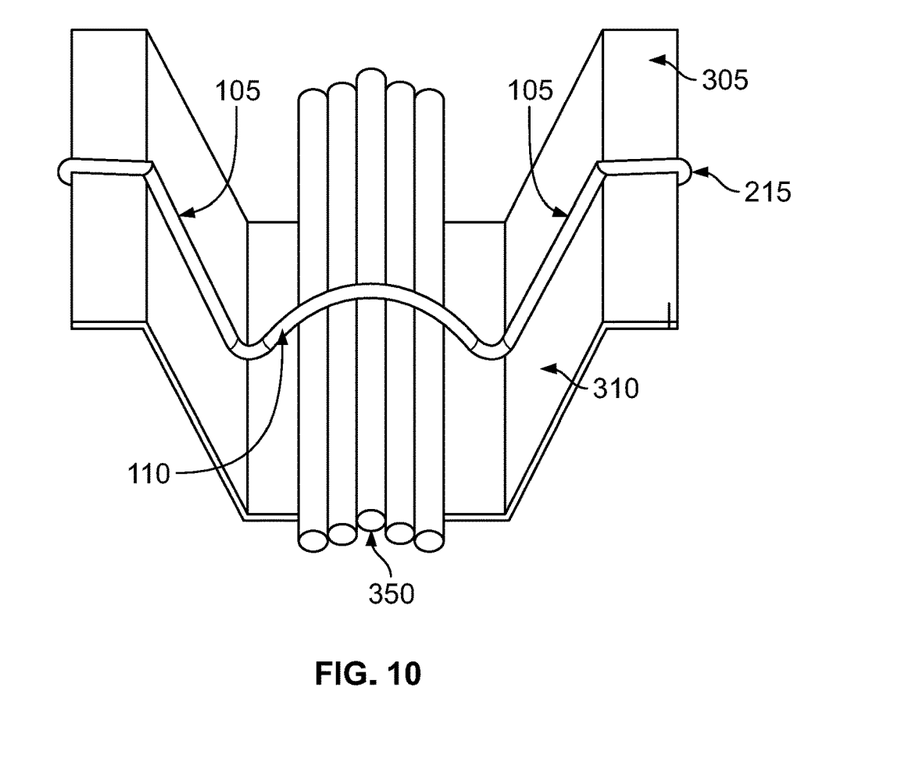
FIG. 10 is a bottom view of the purlin cable hanger of FIG. 7 securing, retaining, or holding, a plurality of cables according to some embodiments.

In another embodiment, as shown in FIGS. 7-12, an S-shaped purlin cable hanger 200 uses a first S-shaped securing hook 215 and a second S-shaped securing hook 215 to secure the S-shaped purlin cable hanger 200 to a purlin 300. As illustrated in FIG. 7 and FIG. 8, a first S-shaped securing hook 215 wraps around a first purlin flange 305 and a second securing hook 215 wraps around a second purlin flange 305 such that the first securing hook 215 and the second securing hook 215 transfer the weight of the cables 350 to the top of a first purlin flange 305 and a second purlin flange 305 respectively. The support leg 105 is configured to connect the securing hook 215 to the landing compartment 110. In the illustrated embodiment, the support leg 105 runs parallel to a purlin wall 310. However, in other embodiments, the support leg 105 is not necessarily parallel to the purlin wall 310.

Figure 11:
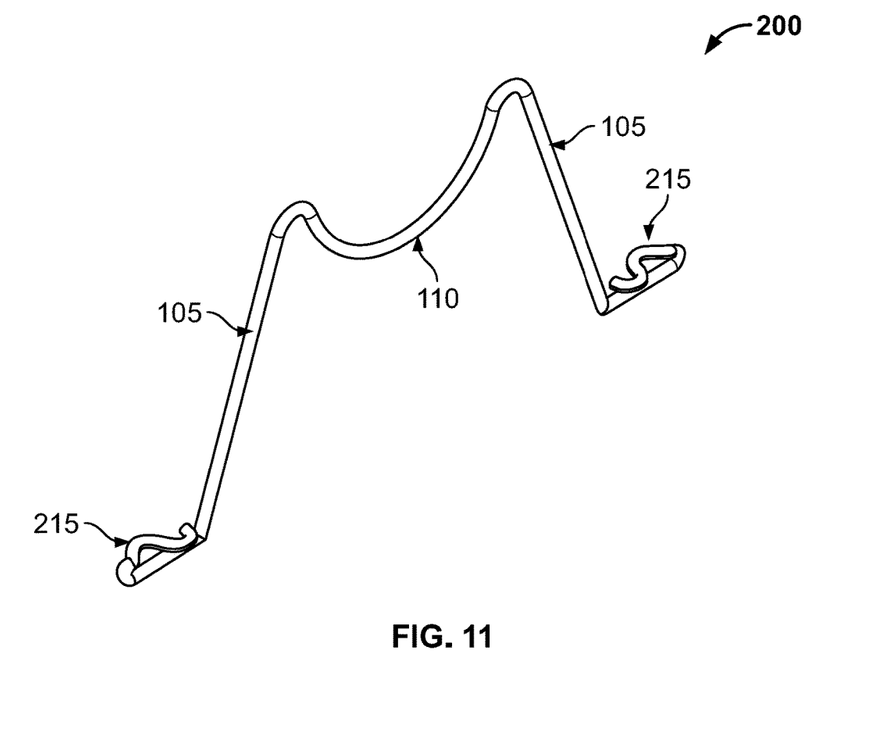
FIG. 11 is a perspective view of the cable hanger of FIG. 7 according to some embodiments.
Figure 12:
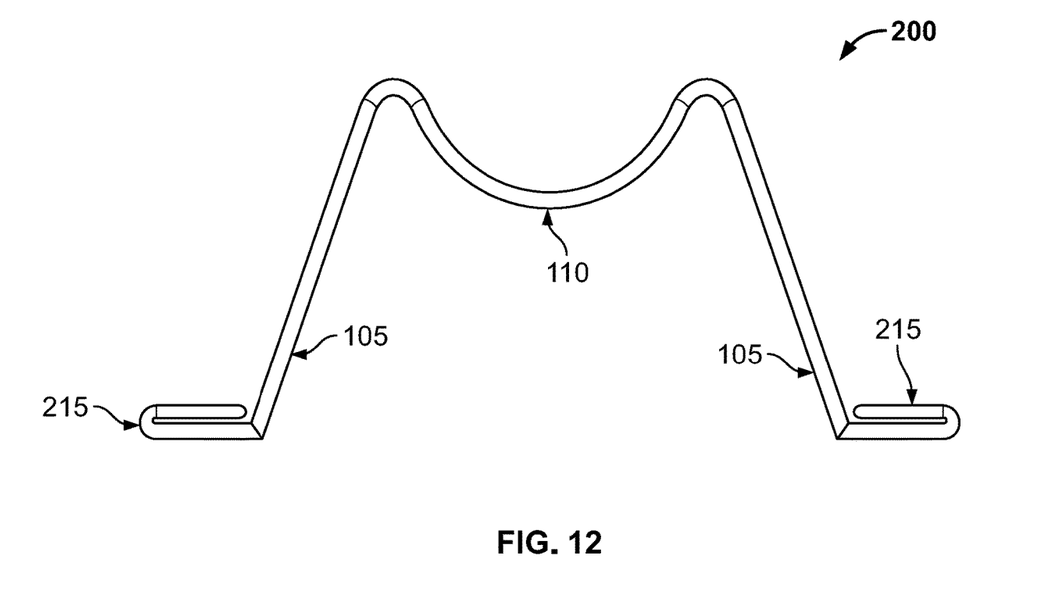
FIG. 12 is a front view of the cable hanger of FIG. 7 according to some embodiments.

As shown in the embodiment illustrated in FIG. 11, the top of the S-shaped securing hooks 215 is shaped like an S. This embodiment is advantageous because it prevents the S-shaped purlin cable hanger 200 from pivoting about the purlin flange 305.

Thus, the application provides, among other things, an apparatus and method the application provides a method of securing one or more cables to purlin. The apparatus and method described herein provide a user with the ability to secure cables of various sizes to purlin without having to use PVC tubing. Various features and advantages of the application are set forth in the following claims.

What is claimed is:

1. A cable hanger configured to secure cables to purlin, the cable hanger comprising:
    a first support leg;
    a second support leg;
    a landing compartment positioned between the first support leg and the second support leg, the landing compartment configured to hold one or more cables;
    a first securing hook connected to the first support leg; and
    a second securing hook connected to the second support leg;
    wherein the first securing hook and the second securing hook are configured to secure the cable hanger to the purlin, and
    wherein the first securing hook and the second securing hook are substantially S-shaped.

2. The cable hanger of claim 1, wherein the landing compartment is positioned above the first securing hook and the second securing hook.

3. The cable hanger of claim 1, wherein the cable hanger is formed of at least one selected from a group consisting of a single cable of steel, a single rod of steel, a single cable of galvanized steel, a single rod of galvanized steel, a single cable of zinc plated steel, a single rod of zinc plated steel, a single cable of polyvinyl chloride (PVC) coated steel, a single rod of PVC coated steel, a single cable of PVC coated galvanized steel, a single rod of PVC coated galvanized steel, a single cable of powder coated steel, a single rod of powder coated steel, a single cable of powder coated galvanized steel, a single rod of powder coated galvanized steel, a single cable of PVC coated zinc steel, a single rod of PVC coated zinc steel, a single cable of powder coated zinc steel, and a single rod of powder coated zinc steel.

4. The cable hanger of claim 1, wherein the first support leg is parallel to a first purlin wall and the second support leg is parallel to a second purlin wall.

5. The cable hanger of claim 1, wherein the cable hanger is configured to secure cables to a hat-channel purlin.

6. The cable hanger of claim 5, wherein the first securing hook is configured to attach to a first purlin flange and the second securing hook is configured to attach to a second purlin flange.

7. The cable hanger of claim 1, wherein the cable hanger is made from a single piece of material.

8. A method of securing one or more cables to a purlin, the method comprising:
    providing a single piece of material;
    forming, from the single piece of material, a landing compartment configured to support at least a first cable;
    forming, from the single piece of material, a first securing hook configured to secure the single piece of material to a first flange of the purlin; and
    forming, from the single piece of material, a second securing hook configured to secure the single piece of material to a second flange of the purlin,
    wherein the first securing hook and the second securing hook are substantially S-shaped.

9. The method of claim 8, wherein the single piece of material is formed of at least one selected from a group consisting of a single cable of steel, a single rod of steel, a single cable of galvanized steel, a single rod of galvanized steel, a single cable of zinc plated steel, a single rod of zinc plated steel, a single cable of polyvinyl chloride (PVC) coated steel, a single rod of PVC coated steel, a single cable of PVC coated galvanized steel, a single rod of PVC coated galvanized steel, a single cable of powder coated steel, a single rod of powder coated steel, a single cable of powder coated galvanized steel, a single rod of powder coated galvanized steel, a single cable of PVC coated zinc steel, a single rod of PVC coated zinc steel, a single cable of powder coated zinc steel, and a single rod of powder coated zinc steel.

10. The method of claim 8, wherein the landing compartment is positioned above the first flange of the purlin and the second flange of the purlin.

11. The method of claim 8, wherein the purlin is a hat-channel purlin.

12. A cable hanger configured to secure cables to a purlin, the cable hanger comprising:
- a first support leg;
- a second support leg;
- a landing compartment positioned between the first support leg and the second support leg, the landing compartment configured to hold one or more cables;
- a first securing hook extending from the first support leg; and
- a second securing hook extending from the second support leg;

wherein the first securing hook and the second securing hook are configured to secure the cable hanger to the purlin, and wherein the first securing hook and the second securing hook are substantially S-shaped.

13. The cable hanger of claim 12, wherein the landing compartment is positioned above the first securing hook and the second securing hook.

14. The cable hanger of claim 12, wherein the first support leg is parallel to a first purlin wall and the second support leg is parallel to a second purlin wall.

15. The cable hanger of claim 12, wherein the cable hanger is configured to secure cables to a hat-channel purlin.

16. The cable hanger of claim 15, wherein the first securing hook is configured to attach to a first purlin flange and the second securing hook is configured to attach to a second purlin flange.

17. The cable hanger of claim 12, wherein the cable hanger is made from a single piece of material.

* * * * *